United States Patent Office 3,407,209
Patented Oct. 22, 1968

3,407,209
METHOD FOR THE RECOVERY OF CARBAZOLE FROM COAL TAR FRACTIONS
Louis A. Joó, Johnson City, Tenn., assignor to Great Lakes Carbon Corporation, New York, N.Y., a corporation of Delaware
No Drawing. Filed Dec. 27, 1965, Ser. No. 526,925
5 Claims. (Cl. 260—318)

ABSTRACT OF THE DISCLOSURE

Carbazole of a purity sufficient to reach a level of 95+% with one recrystallization, is obtained in good yield by lixiviating the bulk of the impurities from an anthracene-poor cake containing as little as 15% carbazole, with an aromatic hydrocarbon liquid having a boiling point not exceeding about 200° C. One elution of the cake suffices when carried at a liquid to cake ratio of at least 0.5:1 at 25° C. and at least 9:1 at −50° C., the relationship between ratio and temperature over the entire range being inversely proportional. The crude carbazole starting material is previously obtained by a low temperature leaching of anthrancene salts according to the method of U.S. Patent 3,285,987.

---

The present invention relates to a method for recovering carbazole from coal tar distillates and, in particular, to a simple process which gives a good yield of carbazole at high purity and low cost.

Carbazole is a useful and important compound in the synthesis of dyes and fungicides, in the manufacture of certain polymers such as vinyl carbazole and as a reagent for lignins, carbohydrates and formaldehyde. Although several syntheses of the compound have been devised, the most important source for its preparation remains coal tar. The distillation of coal tar yields "anthracene oil," also called "green oil," which constitutes approximately 9% of the tar. It has a boiling range of about 300–360° C. On standing, this oil deposits "anthracene salts," which are separated by filter pressing or by centrifuging. These salts consist principally of varying amounts of anthracene, carbazole, phenanthrene and acridine, as well as smaller amounts of other related materials. The carbazole content of anthracene salts can vary between 5 and 20% by weight depending on the nature of the coal and on the process employed to obtain the original tar and the anthracene salts. These anthracene salts then are the raw materials on which our recovery method shall be applied.

There is no standard method for the separation of carbazole from the compounds with which it is mixed in anthracene salts or cake. There has been used for this purpose various techniques and combinations of techniques such as selective extraction with organic or inorganic solvents, fractional distillation and chemical separation.

According to one method, for instance, the anthracene cake is first allowed to react with an alkali metal hydroxide such as sodium or potassium hydroxide, thus forming the potassium or sodium salt of carbazole. The unreacted cake components, i.e., anthracene, phenanthrene, etc., are then distilled off and the residual carbazole salt is purified and subsequently acidified to liberate the carbazole. The carbazole thus obtained is extracted and recrystallized. This method while theoretically simple suffers from several disadvantages, of which the principal ones are the unavoidable use of unrecoverable chemicals and the formation of carbonaceous material by cracking during the distillation step. Another method concerns itself with the extraction of carbazole by concentrated sulfuric acid. This method also has several drawbacks. It uses too much sulfuric acid. In addition, the presence of large quantities of concentrated sulfuric acid poses problems of equipment construction, recovery and reconcentration of the sulfuric acid and disposal of polymeric impurities resulting from the sulfonation of carbazole and other materials present in anthracene cake.

The fractional distillation of anthracene cake components for the recovery of carbazole is not very satisfactory because of the closeness in boiling points of all the components of anthracene cake as well as the similarities in other properties of said components.

A few methods based on selective extraction of anthracene salts components are known but as far as the production of carbazole is concerned, they are generally inadequate, having been devised specifically for the extraction of the most important component of the mixtures, anthracene. What has specifically been done for the recovery of carbazole too often involves either a complex series of extractions, the use of relatively expensive solvents such as those containing the furane ring and organic bases, or a combination of solvent extraction with some other physical or chemical process such as fractional distillation and the formation of a carbazole salt. It is not surprising therefore that under such circumstances no method has clearly succeeded in dominating what remains an essentially empirical field.

In an earlier application filed on Feb. 8, 1965, Ser. No. 431,200, now U.S. Patent 3,285,987, there was disclosed a process for the recovery of anthracene from anthracene cake. The process consisted simply in extracting the nonanthracene components from the anthracene cake at a temperature (T) in the range of 20° C. to −50° C. in combination with a ratio (R) of solvent to anthracene cake of 2:1 to 19:1 by weight so that the percent yield (Y) approaches the percent purity (P), R and T being so correlated that $0.25 < P^2Y < 0.73$. In this manner, using such solvents as have previously served in the extraction or leaching of impurities from anthracene cake, e.g., aromatic hydrocarbons, heterocyclic compounds, ketones, ethyl esters of saturated acids having less than 4 carbon atoms and mixtures of these and other solvents, there was obtained, in one operation, residues of anthracene containing as much as 75% of the total weight of anthracene present in the anthracene cake and this at a purity as high as 85%. According to the art that had existed heretofore, any attempt to recover anthracene from such crude material as anthracene salts or cake was handicapped by the necessity of sacrificing either the yield in order to obtain high purity or the purity in order to obtain high yield. This is no longer the case.

It has now been discovered that if the solvent is removed from the extract obtained from crude anthracene cake according to the method described in copending application Ser. No. 431,200, now U.S. Patent 3,285,987, and if the anthracene-poor residue thus obtained is eluted with an aromatic hydrocarbon liquid at a temperature within the range of 25° C. to −50° C. at a minimum solvent to cake ratio of 0.5:1 at 25° and 9:1 at −50° C., the relationship between said temperature and liquid to solid ratio being substantially inversely proportional, there will remain, after the removal of the eluate, carbazole in good yield and of a quality such that it is but one simple recrystallization removed from a 95+% state of purity.

The method employed in the present invention shall be illustrated by the following examples. These are provided as guides in establishing the limits of the invention and are not to be construed therefore as limiting the invention beyond the scope of the appended claims. All percentages and ratios given in these examples and in the claims are on a weight basis unless otherwise noted.

EXAMPLE I

Crude anthracene cake, containing among other materials 40% anthracene and 16% carbazole, was extracted with acetone at a solvent to solid ratio of 9:1 at −20° C. The undissolved anthracene was filtered off and constituted about 75–80% of the total anthracene present in the crude cake. It had a purity of 85% and contained less than 3% carbazole.

The acetone was then stripped from the eluate to leave a mushy substance containing 20% carbazole. This substance was subsequently extracted with benzene and toluene at the temperatures and solvent to cake ratios indicated in the following tables (Examples 2 to 10).

TABLE I

[Solvent: Benzene; Temperature: 25° C.]

| Example | Solvent/Cake Ratio | Carbazole Recovery, Percent | |
|---|---|---|---|
| | | Purity | Yield |
| 1 | 9:1 | 80.5 | 50.0 |
| 2 | 4:1 | 67.0 | 67.0 |
| 3 | 2.3:1 | 63.0 | 81.0 |

TABLE II

[Solvent: Toluene; Temperature: 25° C.]

| Example | Solvent/Cake Ratio | Carbazole Recovery, Percent | |
|---|---|---|---|
| | | Purity | Yield |
| 4 | 9:1 | 76 | 53 |
| 5 | 4:1 | 65 | 71 |
| 6 | 2.3:1 | 59 | 82 |

TABLE III

[Solvent/Cake Ratio: 9:1]

| Example | Solvent | Temperature, °C. | Carbazole Recovery, Percent | |
|---|---|---|---|---|
| | | | Purity | Yield |
| 1 | Benzene | 25 | 80.5 | 50 |
| 7 | do | 8 | 72 | 73 |
| 4 | Toluene | 25 | 76 | 53 |
| 8 | do | 8 | 73 | 75 |
| 9 | do | −10 | 70 | 82 |
| 10 | do | −20 | 66 | 83 |

A cursory examination of the above data reveals that the purity and the yield of carbazole will be maximized at the colder temperatures and that, for a given solvent to cake ratio, the best results will be afforded at temperatures moderately lower than 0° C. when the freezing point of the solvent allows the use of such conditions. It is also evident that there will be an optimum solvent to cake ratio for a given elution temperature and solvent.

The preferred solvent to cake ratio and temperature ranges that best accommodate all the aromatic hydrocarbon liquids that can be used for the process of this invention has been established at 6:1 to 15:1 and 15° to −20° C. respectively.

As to the solvents that may be used in the practice of this invention, the list includes benzene and those of its liquid alkyl homologs that have a boiling point no higher than about 200° C. Examples of the most useful members of this class are ethylbenzene, propylbenzene, butylbenzene, the xylenes, benzene, toluene and so on. Toluene is preferred.

What is claimed is:

1. In a process for fractionating crude anthracene salts containing about 5 to 20° carbazole by weight, which first comprises the one-step extraction of the nonanthracene components by a solvent selected from the group consisting of aromatic hydrocarbons, heterocyclic compounds, ketones, ethyl esters of saturated acids having less than four carbon atoms and mixtures thereof, at a temperature within the range of 20° C. to −50° C. at a solvent to cake ratio of 2:1 to 19:1 by weight and with said temperature and ratio being so correlated that 0.25< the product of the square of the purity of the nonextracted anthracene by its yield <0.73:

the further one-step elution of the anthracene-poor solids at a temperature within the range of 25° C. to −50° C. with an aromatic hydrocarbon liquid having a boiling point not exceeding about 200° C., said liquid being used at a solvent to cake weight ratio of about 0.5:1 at 25° C. and about 9.1 at −50° C. with the relationship between temperature and ratio being substantially inversely proportional over the entire range.

2. The process of claim 1 wherein the aromatic hydrocarbon liquid is selected from the group consisting of benzene, toluene, ethylbenzene, propylbenzene, butylbenzene and the xylenes.

3. The process of claim 1 wherein the further elution of the anthracene-poor solids with the aromatic hydrocarbon liquid is carried out at a temperature within the range of 15° C. to −20° C. and at a liquid to solid weight ratio of about 6:1 to 15:1.

4. The process of claim 3 wherein the aromatic hydrocarbon liquid selected is toluene.

5. The process of claim 3 wherein the aromatic hydrocarbon liquid selected is benzene.

References Cited

UNITED STATES PATENTS

| 1,831,059 | 11/1931 | Daniels | 260—318 |
| 3,285,987 | 11/1966 | Joó et al. | 260—675 |
| 2,764,595 | 9/1956 | De Jong | 260—318 |

HENRY R. JILES, *Primary Examiner.*

C. M. SHURKO, *Assistant Examiner.*